United States Patent
Yamamoto et al.

(10) Patent No.: US 7,746,891 B2
(45) Date of Patent: Jun. 29, 2010

(54) ENABLING MOBILE IPV6 COMMUNICATION OVER A NETWORK CONTAINING IPV4 COMPONENTS USING ISATAP

(75) Inventors: Shu Yamamoto, Cupertino, CA (US);
Carl Williams, Palo Alto, CA (US);
Hidetoshi Yokota, Saitama (JP); Kazuo Hashimoto, Palo Alto, CA (US)

(73) Assignee: KDDI Corporation, Tokyo (JP)

( * ) Notice: Subject to any disclaimer, the term of this patent is extended or adjusted under 35 U.S.C. 154(b) by 1699 days.

(21) Appl. No.: 10/818,662

(22) Filed: Apr. 5, 2004

(65) Prior Publication Data
US 2005/0008032 A1    Jan. 13, 2005

Related U.S. Application Data

(60) Provisional application No. 60/503,641, filed on Sep. 16, 2003, provisional application No. 60/497,943, filed on Aug. 25, 2003, provisional application No. 60/474,794, filed on May 29, 2003.

(51) Int. Cl.
    *H04L 12/28* (2006.01)
(52) U.S. Cl. .................. 370/466; 370/392; 370/338
(58) Field of Classification Search ............. 370/466, 370/400, 338, 331, 352, 395.54
    See application file for complete search history.

(56) References Cited

U.S. PATENT DOCUMENTS

| | | | |
|---|---|---|---|
| 6,172,986 B1 | 1/2001 | Watanuki et al. | |
| 6,553,413 B1 | 4/2003 | Leighton et al. | |
| 6,810,411 B1 | 10/2004 | Coughlin et al. | |
| 6,862,274 B1 * | 3/2005 | Tsao et al. ............... | 370/338 |
| 7,191,226 B2 * | 3/2007 | Flykt et al. ............... | 709/218 |
| 7,216,154 B1 | 5/2007 | Chow et al. | |
| 7,321,598 B2 * | 1/2008 | Blanchet et al. ............ | 370/466 |

(Continued)

FOREIGN PATENT DOCUMENTS

JP    H10-313336    11/1998

(Continued)

OTHER PUBLICATIONS

Shiao-Li Tsao, "Moving in a Dual Stack Internet", NGTRANS WG Internet draft; <draft-ietf-ngtrans-moving-00.txt>.*

(Continued)

*Primary Examiner*—Blane J Jackson
(74) *Attorney, Agent, or Firm*—Fenwick & West LLP (57) ABSTRACT

A mobile IPv6 dual-stack node engages in IPv6 communication while roaming within an IPv4-only network, for example using ISATAP. First, the node determines that it has moved Bnd obtains a new IPv4 address. After determining that the visited network contains no IPv6-enabled components, the node uses an IPv6 connect agent to engage in IPv6 communication. The node configures its care-of address using the IPv6 connect agent's routing information and the node's newly-obtained IPv4 address. In one embodiment, the node and the connect agent optimize the handoff when the nodes has moved but still uses the same connect agent. The node sends a binding updates to the connect agents comprising the node's old care-of address and the node's new care-of address. When the connect agent receives a packet destined for the node's previous care-of address, it forwards the packet to the node's currents care-of address, thereby reducing packet loss.

28 Claims, 5 Drawing Sheets

U.S. PATENT DOCUMENTS

| | | |
|---|---|---|
| 2002/0012320 A1 | 1/2002 | Ogier et al. |
| 2002/0150104 A1 | 10/2002 | Hamamoto et al. |
| 2003/0074461 A1 | 4/2003 | Kang et al. |
| 2004/0013130 A1 | 1/2004 | Blanchet et al. |
| 2004/0136382 A1* | 7/2004 | Sundquist .................... 370/400 |
| 2004/0137888 A1* | 7/2004 | Ohki .......................... 455/417 |
| 2004/0184422 A1* | 9/2004 | Shaheen ..................... 370/331 |
| 2004/0264465 A1* | 12/2004 | Dunk ......................... 370/392 |
| 2005/0160183 A1 | 7/2005 | Valli et al. |
| 2008/0016233 A1 | 1/2008 | Schneider |

FOREIGN PATENT DOCUMENTS

| | | |
|---|---|---|
| JP | H11-068850 | 3/1999 |
| JP | A-2001-268129 | 9/2001 |
| JP | A-2002-314618 | 10/2002 |
| JP | A-2003-018185 | 1/2003 |

OTHER PUBLICATIONS

Johnson, D. B., "Mobility Support in IPv6," Internet Engineering Task Force (IETF) Mobile IP Working Group, Internet-Draft, draft-ietf-mobile-ipv6-10.txt, Feb. 10, 2000, pp. 5, 77, 83, 89, [online] [Retrieved on May 8, 2007] Retrieved from the Internet: URL: <http://tools/ietf.org/html/draft-ietf-mobileip-ipv6-10>.

Tsao, S., et al., "Moving in a Dual Stack Internet," Internet Engineering Task Force (IETF), NGTRANS WG, Internet Draft, draft-ietf-ngtrans-moving-00.txt, Jul. 2001, pp. 1-11, [online] [Retrieved on May 8, 2007] Retrieved from the internet: URL: http://www3.ietf.org/proceedings/01dec/1-D/draft-ietf-ngtrans-movin...>.

Office Action and Translation of Office Action, Japanese Patent Application No. 2004-43577, Nov. 6, 2007, 4 Pages.

U.S. Appl. No. 10/436,679, filed May 12, 2003, Yamamoto, S. et al.

U.S. Appl. No. 10/729,257, filed Dec. 4, 2003, Yokota, H. et al.

U.S. Appl. No. 10/947,880, filed Sep. 22, 2004, Yamamoto, S. et al.

Blanchet, M., et al., "IPv6 Tunnel Broker with the Tunnel Setup Protocol (TSP)", Jun. 14, 2004, [online] [retrieved on Oct. 4, 2004] Retrieved from the internet <URL: http://www.ietf.org/internet-drafts/draft-blanchet-v6ops-tunnelbroker-tsp-01.txt>.

Conta, A., et al., "RFC 2473—Generic Packet Tunneling in IPv6 Specification", Dec. 1998, [online] [retrieved on Oct. 1, 2004] Retrieved from the internet <URL: http://www.faqs.org/rfcs/rfc2473.html>.

Daniel, R., et al., "RFC 2168—Resolution of Uniform Resource Identifiers using the Domain Name System", Jun. 1997, [online] [retrieved on Oct. 1, 2004] Retrieved from the internet <URL: http://www.faqs.org/rfcs/rfc2168.html>.

Droms, R., "RFC 2131—Dynamic Host Configuration Protocol", Mar. 1997, [online] [retrieved on Oct. 1, 2004] Retrieved from the internet <URL: http://www.faqs.org/rfcs/rfc2131.html>.

Durand, A., et al., "RFC 3053—IPv6 Tunnel Broker", Jan. 2001, [online] [retrieved on Jan. 10, 2004] Retrieved from the internet <URL: http://www.faqs.org/rfcs/rfc/rfc3053.html>.

Johnson, D., et al., "RFC 3775—Mobility Support in IPv6", Jun. 2004, [online] [retrieved on Oct. 4, 2004] Retrieved from the internet <URL: http://www.faqs.org/rfcs/rfc3775.html>.

Mealling, M., et al., "RFC 2915—The Naming Authority Pointer (NAPTR) DNS Resource Record", Sep. 2000, [online] [retrieved on Oct. 1, 2004] Retrieved from the internet <URL: http://www.faqs.org/rfcs/rfc2915.html>.

Mealling, M., "RFC 3403—Dynamic Delegation Discovery System (DDDS) Part Three: The Domain Name System (DNS) Database", Oct. 2002, [online] [retrieved on Oct. 1, 2004] Retrieved from the internet <URL: http://www.faqs.org/rfcs/rfc3403.html>.

Nordmark, E. et al., "Basic Transition Mechanisms for IPv6 Hosts and Routers", Sep. 1, 2004, [online] [retrieved on Oct. 4, 2004] Retrieved from the internet <URL: http://www.ietf.org/internet-drafts/draft-ietf-v6ops-mech-v2-06.txt>.

Perkins, C., "RFC 2002—IP Mobility Support", Oct. 1996 [online] [retrieved on Oct. 1, 2004] Retrieved from the internet <URL: http://www.faqs.org/rfcs/rfc2002.html>.

Perkins, C., "RFC 3344—IP Mobility Support for IPv4", Aug. 2002, [online] [retrieved on Oct. 1, 2004] Retrieved from the internet <URL: http://www.faqs.org/rfcs/rfc3344.html>.

Partridge, C., et al., "RFC 1546—Host Anycasting Service", Nov. 1993, [online] [retrieved on Oct. 1, 2004] Retrieved from the internet <URL: http://www.faqs.org/rfcs/rfc1546.html>.

Simpson, W., "RFC 1661—The Point-to-Point Protocol (PPP)", Jul. 1994, [online] [retrieved on Oct. 1, 2004] Retrieved from the internet <URL: http://www.faqs.org/rfcs/rfc1661.html>.

Templin, F., et al., "Intra-Site Automatic Tunnel Addressing Protocol (ISATAP)", May 26, 2004, [online] [retrieved on Oct. 4, 2004] Retrieved from the internet <URL: http://www.ieft.org/internet-drafts/draft-ietf-ngtrans-isatap-22.txt>.

Johnson, D., et al., "Mobility Support in IPv6," IETF Mobile IP Working Group, Nov. 18, 1998, [online] [retrieved on Oct. 30, 2006] Retrieved from the Internet: <URL: http://www3.ietf.org/proceedings/98dec/I-D/draft-ietf-mobileip-ipv6-07.txt>.

Decision of Rejection, Japanese Patent Application No. 2004-043577, Jun. 24, 2008, 3 Pages.

Stevens, R., "TCP/IP Illustrated, vol. 1: The Protocols," Dec. 31, 1993, pp. 1-24.

Waddington et al., "Realizing the Transition to IPv6," Transitioning to IPv6, IEEE Communications Magazine, Jun. 2002, p. 138-148.

Japanese Office Action, Japanese Patent Application No. 2004-158138, Jul. 7, 2009, 5 pages.

United States Office Action, U.S. Appl. No. 10/729,257, Aug. 13, 2009, 13 pages.

"Net Design As You Want It," Nikkei Communication, Jun. 17, 1999, vol. 294, pp. 103-106, 8 pages.

Suzuki, S., "Relaying Separated v6 Net by v4," Nikkei Network, 2001, vol. 16, pp. 111-114, 8 pages.

"Universal Plug and Play," Feb. 23, 2001, [online][Retrieved on Jan. 4, 2008] Retrieved from the Internet: URL: <http://web.archive.org/web/20010405172508/whatis.techtarget.com/definition/0,289893,sid9_gci525224,00.html>, 3 pages.

Blanchet, M. et al., "IPv6 over IPv4 Profile for Tunnel Setup Protocol (TSP) draft-vg-ngtrans-tsp-v6v4profile-00," Jul. 13, 2001, 14 pages.

Blanchet, M. et al., "Tunnel Setup Protocol (TSP) draft-vg-ngtrans-tsp-00," Jun. 2001, 12 pages.

Japanese Notice of Allowance, Japanese Patent Application No. 2004-158138, Dec. 1, 2009, 6 pages (including English translation).

Japanese Office Action, Japanese Patent Application No. 2004-244349, Dec. 1, 2009, 7 pages (including English translation).

Japanese Office Action, Japanese Patent Application No. 2004-278475, Dec. 15, 2009, 6 pages (including English translation).

"Automatic Setting IPv6-over-IPv4 Network Tunneling Technology," Nikkei Byte, Jul. 2003, 12 pages (including English translation).

Takeyoshi, H., et al. "Evaluation of the Hierarchical Mobile IPv6 Based Network Incorporating Route Optimization Effect," The Institute of Electronics, Information and Communication Engineers, Technical Report of IEICE, 2002, 12 pages (including English translation).

\* cited by examiner

ENABLING MOBILE IPV6 COMMUNICATION OVER A NETWORK CONTAINING IPV4 COMPONENTS USING ISATAP

CROSS-REFERENCE TO RELATED APPLICATIONS

This application claims priority from the following U.S. provisional patent applications, which are hereby incorporated by reference: Ser. No. 60/497,943 filed on Aug. 25, 2003, entitled "Using Extensions to ISATAIP to Enable MIPv6 Communication Across Network Containing Ipv4 Components"; Ser. No. 60/503,641 filed on Sep. 16, 2003, entitled "Optimized Mobile Ipv6 Extensions in an ISATAP Ipv6 Enabled Network (Optimized ISATAP-MIPv6 Service Architecture)"; and Ser. No. 60/474,794 filed on May 29, 2003, entitled "Automatic Ipv6 Connect Agent Discovery Using DNS." This application is related to the following U.S. provisional patent application, which is hereby incorporated by reference: Ser. No. 60/448,957 filed on Feb. 21, 2003, entitled "ISP Ipv6 Connect Service."

FIELD OF INVENTION

The present invention relates generally to Internet Protocol communication, and specifically to enabling Mobile Internet Protocol Version 6 communication over a network containing Internet Protocol Version 4 components using ISATAP and Mobile IPv6 handover optimizations.

BACKGROUND OF INVENTION

Internet Protocol Version 6 (IPv6) is a new version of the Internet Protocol, designed as the successor to Internet Protocol version 4 (IPv4). Since IPv6 does not support mobility, packets addressed to a mobile IPv6 node (a node that dynamically changes its access point to the Internet) cannot reach the node when it is away from its home link. In order to support mobile IPv6 nodes, Mobile IPv6 (MIPv6) was created. MIPv6 enables mobile IPv6 nodes to remain reachable while they move around in IPv6 networks.

However, there are currently two versions of Internet Protocol in use: the widely used but older Internet Protocol Version 4 (IPv4) and the less used but newer Internet Protocol Version 6 (IPv6). If a mobile IPv6 node moves to an IPv4-only network, the mobile IPv6 node will be unable to continue IPv6 communication with its corresponding IPv6 peers. This is because the originating mobile IPv6 node would first have to communicate with an IPv4-only node, which then would have to communicate with the terminating IPv6 node. This is not supported by either IPv6 or MIPv6. While IPv6 is expected to gradually replace IPv4, the two versions will coexist for a number of years during the transition period. Thus, enabling a mobile IPv6 node to engage in IPv6 communication with other IPv6 nodes, even when the mobile IPv6 node is in an IPv4-only network, is an important concern among users of the Internet.

What is needed are methods and systems for a mobile IPv6 node in an IPv4-only network to engage in IPv6 communication across the IPv4-only network. The methods and systems should not require an upgrade of the IPv4-only network.

SUMMARY OF INVENTION

In order to engage in IPv6 communication over a network containing no IPv6-enabled components, a mobile dual-stack node uses an IPv6 connect agent to configure a new care-of address.

The mobile IPv6 dual-stack node determines that it has moved. The node then obtains a new IPv4 address. The node determines that the visited network contains no IPv6-enabled components. The node finds an IPv6 connect agent, for example an ISATAP router, which enables the node to engage in IPv6 communication over the IPv4-only network. The node then performs a Mobile IPv6 handover and configures a care-of address using information from the IPv6 connect agent. In one embodiment, the new care-of address is in ISATAP format. MIPv6 binding updates are then sent to the node's home agent and corresponding peers.

In one embodiment, the node and the connect agent optimize the handoff. The node detects that it has moved but still uses the same connect agent. The node then sends a binding update to the connect agent comprising the node's old and new care-of addresses. The connect agent receives the binding update and, in one embodiment, stores the binding update in a binding cache that maps the old care-of address to the new care-of address. Later, when the connect agent receives a packet destined for the node's previous care-of address, the connect agent forwards the packet to the node's current care-of address, thereby reducing packet loss.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

Figure 1A:
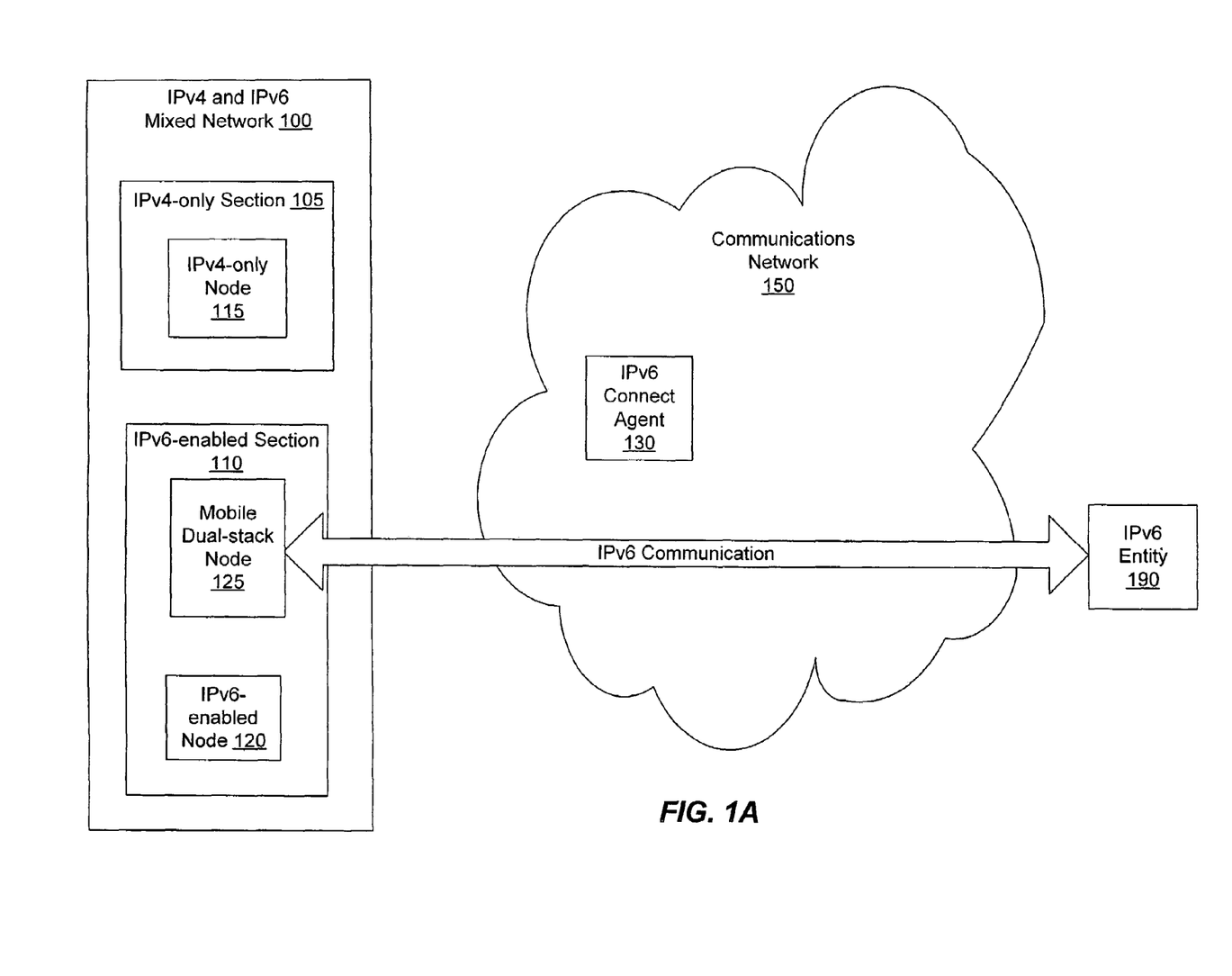
FIG. 1A is a block diagram illustrating a high level overview of a mobile dual-stack node in an IPv6 section of an IPv4 and IPv6 mixed network engaging in IPv6 communication over the IPv6 network, according to one embodiment of the present invention.

FIG. 1A is a block diagram illustrating a high level overview of a mobile dual-stack node in an IPv6 section of an IPv4 and IPv6 mixed network engaging in IPv6 communication over the IPv6 network, according to one embodiment of the present invention. The illustrated embodiment includes a mixed network 100, a communications network 150, and an IPv6 entity 190. In the illustrated embodiment, mixed network 100 and IPv6 entity 190 are coupled to communications network 150.

A mixed network is a network that contains both IPv4-only components and IPv6-enabled components. In the illustrated embodiment, mixed network 100 includes an IPv4-only section 105 and an IPv6-enabled section 110. IPv4-only section 105 includes one IPv4-only node 115, and IPv6-enabled section 110 includes one IPv6-enabled node 120 and one mobile dual-stack node 125. A dual-stack node is a node that contains both an IPv4 stack and an IPv6 stack and thus can engage in both IPv4 and IPv6 communications. The illustrated architecture is used only by way of example. While FIG. 1A illustrates one IPv4-only node 115 in IPv4-only section 105, the present invention applies to any architecture containing one or more IPv4-only nodes 115 in IPv4-only section 105. In addition, while FIG. 1A illustrates one IPv6-enabled node 120 and one mobile dual-stack node 125 in IPv6-enabled section 110, the present invention applies to any architecture containing one or more IPv6-enabled nodes 120 and one or more mobile dual-stack nodes 125 in IPv6-enabled section 110.

Communications network 150 may include multiple processing systems and comprises a local area network (LAN), a wide area network (WAN; e.g., the Internet), and/or any other interconnected data path across which multiple devices can communicate. In the illustrated embodiment, communications network 150 includes one IPv6 connect agent 130. This architecture is used only by way of example. While FIG. 1A illustrates one IPv6 connect agent 130, the present invention applies to any architecture containing zero or more IPv6 connect agents 130. When more than one IPv6 connect agent 130 is available, a mobile dual-stack node 125 has a choice regarding which IPv6 connect agent 130 to use. In addition, while the illustrated embodiment shows the IPv6 connect agent 130 located externally to the network containing the mobile dual-stack node 125, in another embodiment, the IPv6 connect agent 130 is located within the network containing mobile dual-stack node 125.

An IPv6 connect agent 130 is a node that includes the functionality required to enable a mobile dual-stack node 125 residing in the IPv4-only section 105 of a mixed network 100 (or in an IPv4-only network) to engage in IPv6 communications across the network. IPv6 connect agent 130 will be further discussed below with respect to FIG. 1B.

As shown in FIG. 1A, mobile dual-stack node 125 is located within the Ipv6-enabled section 110 of mixed network 100. Since mobile dual-stack node 125 is located within the Ipv6-enabled section 110, mobile dual-stack node 125 can use MIPv6 to send and receive packets while it is away from its home network. In this embodiment, Ipv6 connect agent 130 is not used.

Figure 1B:
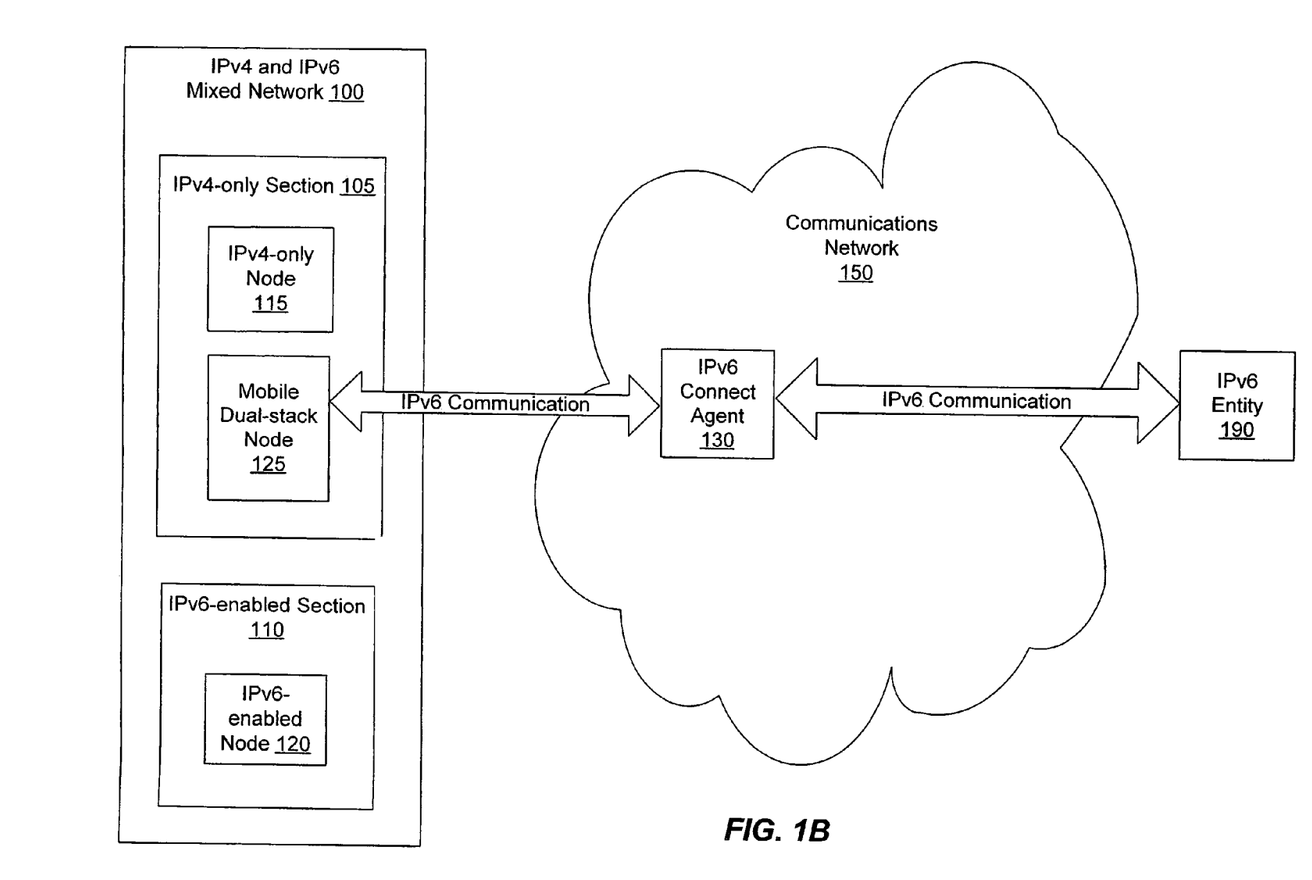
FIG. 1B is a block diagram illustrating a high level overview of a mobile dual-stack node in an IPv4 section of an IPv4 and IPv6 mixed network engaging in IPv6 communication over the IPv6 network, according to one embodiment of the present invention.

FIG. 1B is a block diagram illustrating a high level overview of a mobile dual-stack node in an IPv4 section of an IPv4 and IPv6 mixed network engaging in IPv6 communication over the IPv6 network, according to one embodiment of the present invention. FIG. 1B is similar to FIG. 1A except that the mobile dual-stack node 125 has moved within mixed network 100 from the IPv6-enabled section 110 to the IPv4-only section 105.

As discussed above, MIPv6 enables a mobile IPv6-enabled node to send and receive packets only while the mobile IPv6-enabled node 125 remains within an IPv6-enabled network (or within an IPv6-enabled section of a mixed network). MIPv6 does not enable communication when the mobile IPv6-enabled node 125 is located within an IPv4-only network (or within an IPv4-only section of a mixed network). Thus, IPv6 connect agent 130 is needed to enable IPv6 communication between mobile dual-stack node 125 and IPv6 entity 190 when mobile dual-stack node 125 is located in an IPv4-only network (or in the IPv4-only section of a mixed network).

In one embodiment, IPv6 connect agent 130 implements the Intra Site Automatic Tunneling and Addressing Protocol (ISATAP). ISATAP enables a static dual-stack node residing in an IPv4-only network or in an IPv4-only section of a mixed network to engage in IPv6 communication over the IPv4-only or mixed network. Specifically, an ISATAP-enabled device, such as a router or server, enables an originating dual-stack node to tunnel packets to the IPv6 next-hop address through the IPv4-only network. In other words, the IPv4-only network is treated as a link layer for IPv6. ISATAP is known to those of ordinary skill in the relevant art and is further described in "Intra-Site Automatic Tunnel Addressing Protocol (ISATAP)" (Internet-Draft) by F. Templin, T. Gleeson, M. Talwar, and D. Thaler, October 2003.

While ISATAP enables IPv6 communication over an IPv4-only or mixed network, ISATAP can be used with only static originating nodes, not mobile originating nodes. Mobile IPv6 does support the originating node moving and thereby changing its point of access to network 150. As discussed above, MIPv6 enables mobile IPv6-enabled nodes to remain reachable while they move around in IPv6-enabled networks. In MIPv6, each mobile node is always identified by its home address, regardless of its current point of attachment to the network. While situated away from its home, a mobile node is also associated with a care-of-address, which provides information about the mobile node's current location. IPv6 packets addressed to a mobile node's home address are transparently routed to its care-of address. MIPv6enables IPv6-enabled nodes to cache the binding of a mobile node's home address with its care-of address and to then send any packets destined for the mobile node directly to it at this care-of address. All IPv6-enabled nodes, whether mobile or stationary, can communicate with mobile nodes. MIPv6 is known to those of ordinary skill in the relevant art and is further described in "Mobility Support in IPv6" (Internet-Draft) by D. Johnson, C. Perkins, and J. Arkko, June 2003.

In order to overcome the limitations of ISATAP and MIPv6, in one embodiment, the mobile dual-stack node 125 comprises inventive software components that enable the mobile dual-stack node 125 to move to an IPv4-only network and engage in IPv6 communication. Note that the methods and systems described herein do not require the IPv4-only elements of the mixed network 100 or IPv4-only network to be upgraded to IPv6 to enable the mobile dual-stack node 125 to engage in IPv6 communication.

Figure 2:
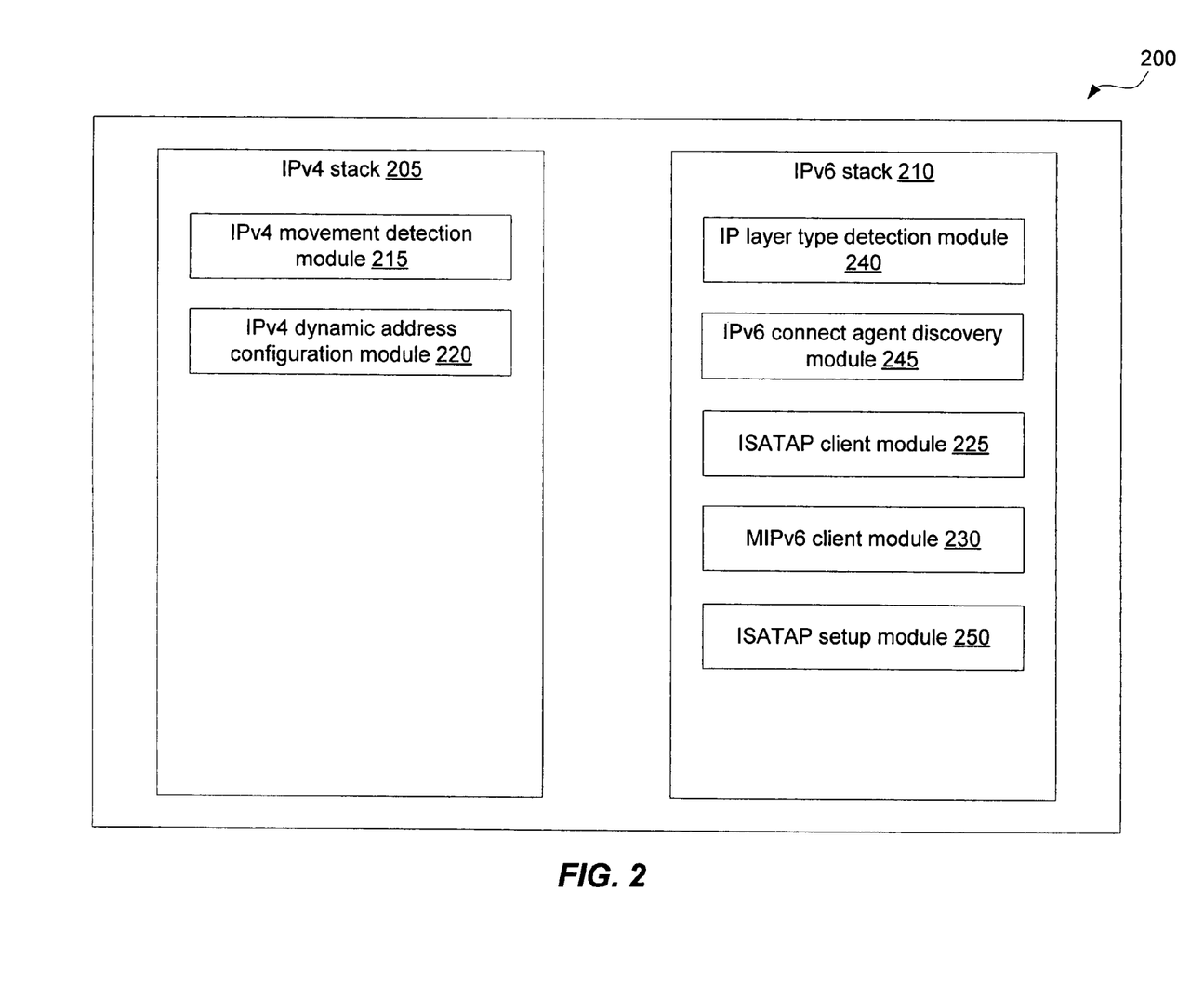
FIG. 2 is a block diagram of a customized stack of a mobile dual-stack node, according to one embodiment of the invention.

FIG. 2 is a block diagram of a customized stack of a mobile dual-stack node, according to one embodiment of the invention Stack 200 comprises an IPv4 stack 205 and an IPv6 stack 210. IPv4 stack 205 comprises IPv4 movement detection module 215 and Ipv4 dynamic address configuration module 220. IPv6 stack 210 comprises ISATAP client module 225, MIPv6 client module 230, ISATAP setup module 250, IP layer type detection module 240, and IPv6 connect agent discovery module 245.

IPv4 movement detection module 215 determines that an IPv4-enabled node has moved from one access point in a network to another access point. Specifically, IPv4 movement detection module 215 detects that the node has detached from one subnet or network and attached to a different subnet or network, thereby using a different router. If the node uses a wireline connection, the IPv4 movement detection module 215 detects that the node has physically detached itself from the network. If the node uses a wireless connection, the IPv4 movement detection module 215 detects that the node has stopped using a particular wireless access point. Methods of detecting network detachment and attachment are known to those of ordinary skill in the relevant art and are further described in "IP Mobility Support" (RFC 2002) by C. Perkins, October 1996.

IPv4 dynamic address configuration module 220 obtains an IPv4 address for an IPv4-enabled node. Methods of dynamically obtaining an IPv4 address, such as Domain Host Control Protocol (DHCP) or Point-to-Point Protocol (PPP), are known to those of ordinary skill in the art.

IP layer type detection module 240 determines whether a node is in a network containing IPv6-enabled components. In one embodiment, a network contains IPv6-enabled components if a node in the network receives an IPv6 router advertisement. The node may wait to receive an IPv6 router advertisement or it may solicit one by sending an IPv6 router solicitation.

IPv6 connect agent discovery module 245 determines the IPv4 address of an IPv6 connect agent. In one embodiment, this is performed by sending an IPv4 anycast broadcast. In another embodiment, this is performed by contacting a Domain Name System (DNS) server, as explained in U.S. patent application Ser. No. 10/729,257 entitled "Automatic IPv6 Connect Agent Discovery using DNS" and filed on Dec. 4, 2003, which is hereby incorporated by reference in its entirety.

ISATAP client module 225 implements ISATAP so that a dual-stack node can use an ISATAP-enabled connect agent to send and receive IPv6 communications over an IPv4-only or mixed network.

MIPv6 client module 230 implements MIPv6, registering and updating the node's care-of address.

ISATAP setup module 250 notifies an IPv6 connect agent 130 of a node's IPv4 address.

Figure 3:
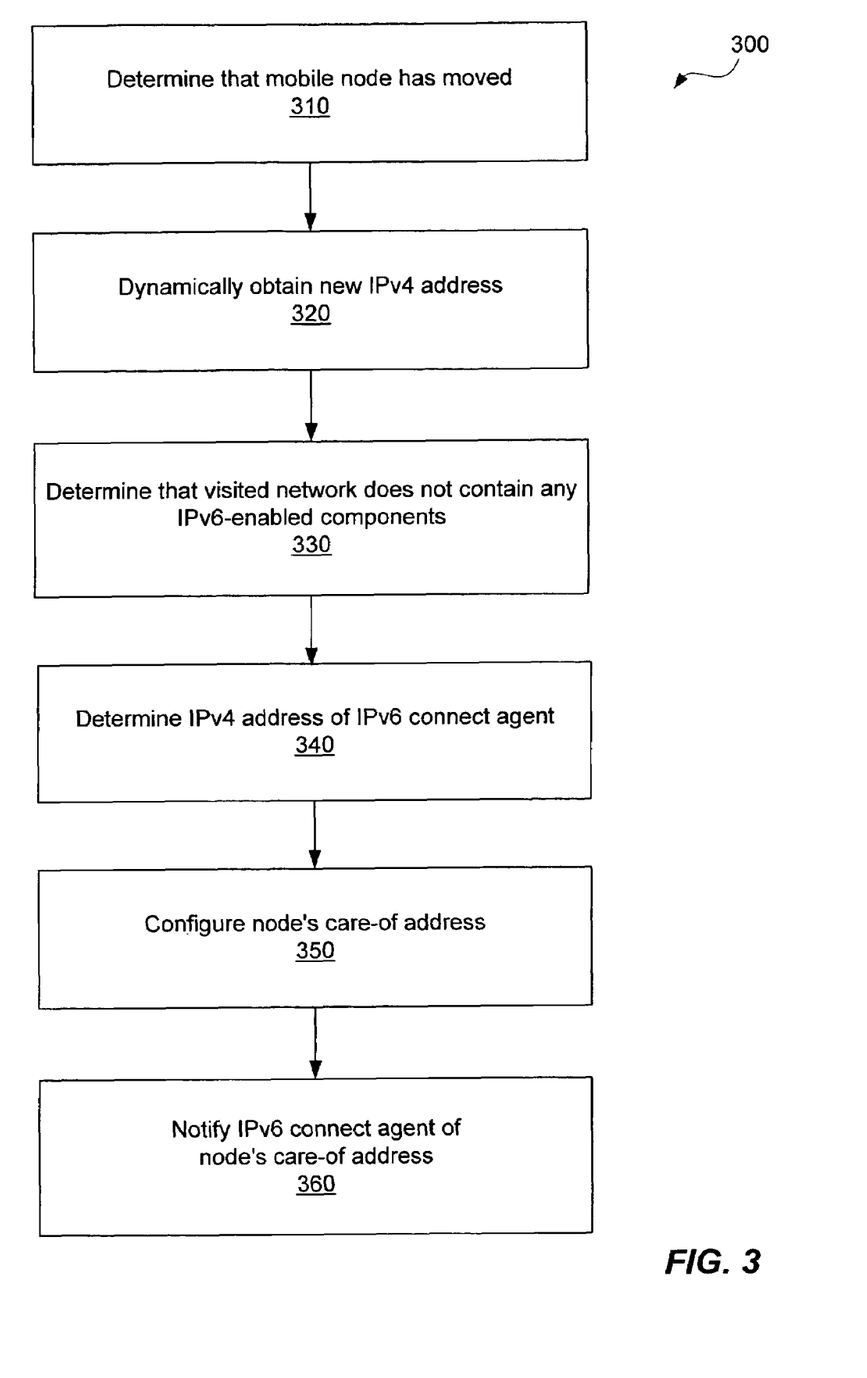
FIG. 3 is a flowchart illustrating steps for a mobile dual-stack node to engage in IPv6 communication after it has moved to an IPv4-only network, according to one embodiment of the invention.

FIG. 3 is a flowchart illustrating steps for a mobile dual-stack node to engage in IPv6 communication after it has moved to an IPv4-only network, according to one embodiment of the invention. In the first step, IPv4 movement detection module 215 determines 310 that the node 125 has moved. Then, IPv4 dynamic address configuration module 220 configures the node's IPv4 connection by dynamically obtaining 320 a new IPv4 address.

The IP layer type detection module 240 then determines 330 whether the surrounding network contains any IPv6-enabled components. If the network contains one or more IPv6-enabled components, then the node 125 engages in IPv6 communication through the IPv6-enabled components (not shown). If the network contains no IPv6-enabled components, then IPv6 connect agent discovery module 245 determines 340 the IPv4 address of an IPv6 connect agent 130.

Next, MIPv6 client module 230 configures 350 the node's care-of address using the IPv6 connect agent's routing information and the node's newly-obtained IPv4 address. Then, ISATAP setup module 250 notifies 360 the IPv6 connect agent 130 of the node's care-of address. The node 125 then uses the IPv6 connect agent 130 to communicate with an IPv6 entity 190 over the IPv4-only network, as shown in FIG. 1B.

Handover Optimization

In one embodiment, the handover that occurs when a mobile dual-stack node 125 moves within an IPv4-only network 105 is optimized. A mobile dual-stack node 125 in an IPv4-only network 105 accesses the network using an IPv4 router. When the node 125 moves within the IPv4-only network 105, it uses a different IPv4 router to access the network. In order to receive packets at its new location, the node 125 sends a binding update to its home agent and corresponding nodes binding its old care-of address to its new care-of address. Until the binding update has been received, packets that have already been sent to the node's old care-of address may be lost.

Figure 4:
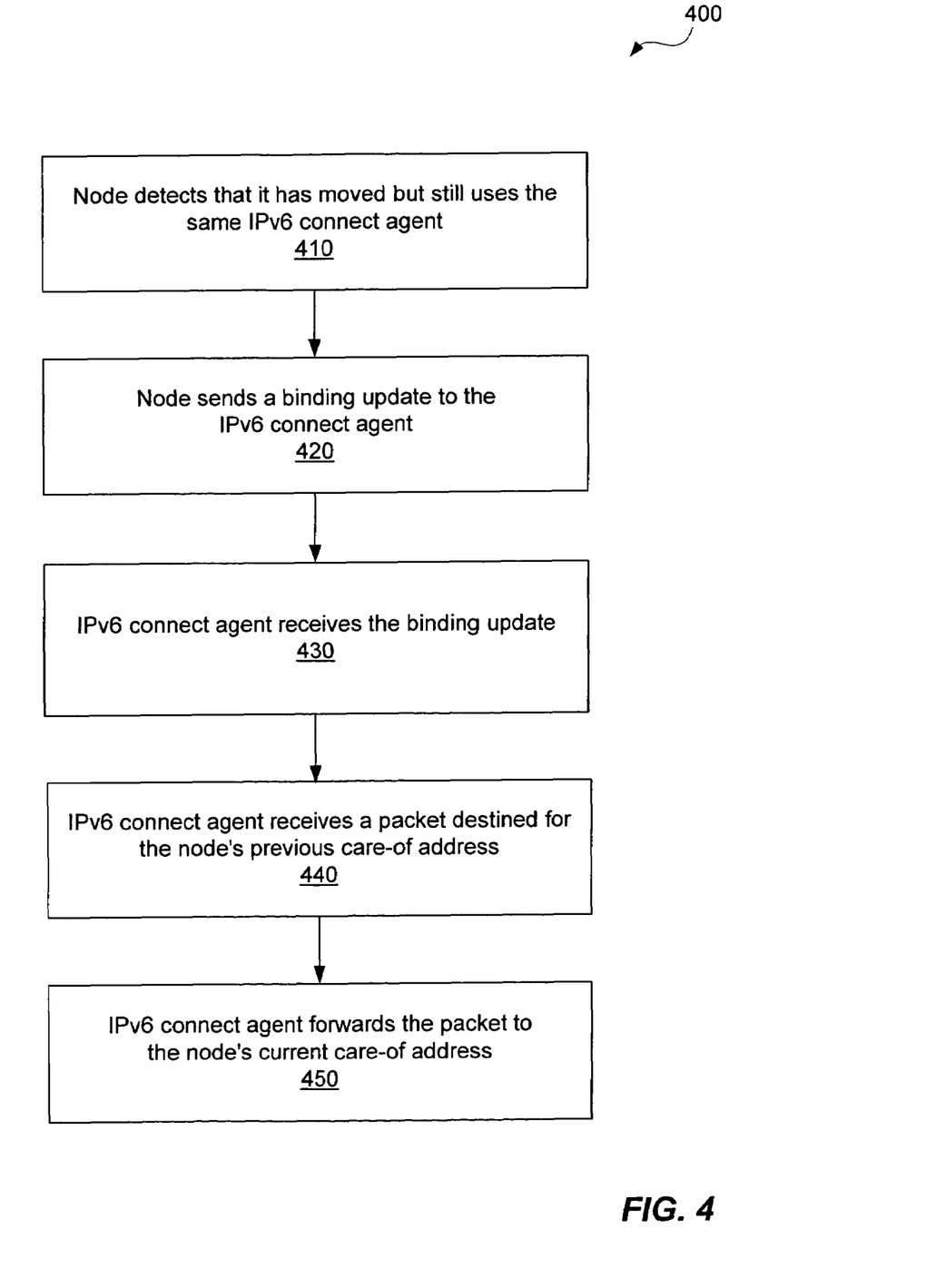
FIG. 4 is a flowchart illustrating steps for a mobile dual-stack node and an IPv6 connect agent to optimize handoffs when the node has moved within an IPv4-only network, according to one embodiment of the present invention.

FIG. 4 is a flowchart illustrating steps for a mobile dual-stack node and an IPv6 connect agent to optimize handoffs when the node has moved within an IPv4 -only network, according to one embodiment of the present invention. In this embodiment, packet loss is reduced by modifying an IPv6 connect agent 130 so that it automatically forwards packets to a node's current care-of address. As described above, a mobile dual-stack node 125 in an IPv4-only network uses an IPv6 connect agent 130 to engage in IPv6 communication over the IPv4-only network. In the first step, mobile dual-stack node 125 detects 410 that it has moved within an IPv4-only network but still uses the same IPv6 connect agent 130. Next, the node 125 sends 420 a binding update to the IPv6 connect agent 130. This binding update binds the node's old care-of address to the node's new care-of address. The IPv6 connect agent 130 then receives 430 the binding update. As a result, when the IPv6 connect agent 130 receives 440 a packet destined for the node's previous care-of address, the IPv6 connect agent 130 forwards 450 the packet to the node's current care-of address.

In one embodiment, this is achieved by adding a binding cache to the IPv6 connect agent 130 and by adding a modified binding update module to the mobile dual-stack node 125. In MIPv6 , an entry in a binding cache maps a node's home address to its care-of address. In contrast, the present invention uses a binding cache entry that maps a node's previous care-of address to its current care-of address. This enables the IPv6 connect agent 130 to map packets that were sent to the mobile IPv6 dual-stack node's old care-of address to the mobile IPv6 dual-stack node's new care-of address.

In one embodiment, the different nature of the binding update is noted by setting a flag in the message containing the binding update. In another embodiment, the binding update is of the same format as a standard MIPv6 binding update but, when sent to the IPv6 connect agent 130, comprises the node's old care-of address rather than the node's home address.

The modified binding module detects when a node has moved within an IPv4 network but still uses the same IPv6 connect agent 130. When this occurs, the modified binding module sends a binding update to the IPv6 connect agent 130.

As will be understood by those familiar with the art, the invention may be embodied in other specific forms without departing from the spirit or essential characteristics thereof. Likewise, the particular naming and division of the modules, features, attributes, methodologies, nodes, servers, connect agents, and other aspects are not mandatory or significant, and the mechanisms that implement the invention or its features may have different names, divisions, and/or formats. Furthermore, as will be apparent to one of ordinary skill in the relevant art, the modules, features, attributes, methodologies, nodes, servers, connect agents, and other aspects of the invention can be implemented as software, hardware, firmware, or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language or for any specific operating system or environment. Accordingly, the disclosure of the present invention is intended to be illustrative, but not limiting, of the scope of the invention.

What is claimed is:

1. A method for a mobile dual-stack node to engage in IPv6 communication across a network containing IPv4 components, the method comprising:
    determining that the mobile dual-stack node has moved;
    obtaining a new IPv4 address of the mobile dual-stack node;
    determining that a visited network does not contain any IPv6-enabled components;
    determining an IPv4 address of an IPv6 connect agent, wherein determining the
        IPv4 address of the IPv6 connect agent comprises one of sending an IPv4
        anycast message and contacting a Domain Name System server;
    obtaining a care-of address; and
    configuring the IPv6 connect agent with the care-of address.

2. The method of claim 1, wherein determining that the node has moved comprises:
    detecting that the node has detached from one of a first network and a first subnetwork; and
    detecting that the node has attached to one of a second network and a second subnetwork.

3. The method of claim 1, wherein obtaining a new IPv4 address comprises using one of Dynamic Host Control Protocol (DHCP) and Point-to-Point Protocol.

4. The method of claim 1, wherein determining that a visited network does not contain any IPv6-enabled components comprises not receiving, within a specified amount of time, an IPv6 router advertisement.

5. The method of claim 1, further comprising:
    responsive to determining that the determined IPv4 address of the IPv6 connect agent is identical to the IPv4 address of the IPv6 connect agent that the node had previously used, sending a binding update to the IPv6 connect agent.

6. The method of claim 5, wherein sending a binding update to the IPv6 connect agent comprises:
    sending a previous care-of address used by the node and the obtained care-of address.

7. A method for an IPv6 connect agent to optimize handoffs when a client node has moved within an IPv4-only network, the method comprising:
    receiving a binding update responsive to a detection that the client node uses the same IPv6 connect agent for a previous IPv6 communication and a current IPv6 communication over the IPv4-only network, the binding update containing a first care-of address and a second care-of address, wherein the first care-of address is associated with the previous IPv6 communication over the IPv4-only network, and the second care-of address is associated with the current IPv6 communication over the IPv4-only network; and
    responsive to receiving a packet sent to the first care-of address, sending the packet to the second care-of address.

8. A system for a mobile dual-stack node to engage in IPv6 communication across a network containing IPv4 components, the system comprising:
    an IPv4 movement detection module configured to determine that the node has moved;
    an IPv4 dynamic address configuration module configured to obtain a new IPv4 address of the mobile dual-stack node;
    an IP layer type detection module configured to determine that a visited network does not contain any IPv6-enabled components;
    an IPv6 connect agent discovery module configured to determine an IPv4 address of an IPv6 connect agent, wherein the IPv6 connect agent discovery module is further configured to send an IPv4 anycast message or to contact a Domain Name System server;
    an ISATAP client module configured to obtain a care-of address; and
    an MIPv6 client module configured to configure the IPv6 connect agent with the care-of address.

9. The system of claim 8, wherein determining that the node has moved comprises:
    detecting that the node has detached from one of a first network and a first subnetwork; and
    detecting that the node has attached to one of a second network and a second subnetwork.

10. The system of claim 8, wherein obtaining a new IPv4 address comprises using one of Dynamic Host Control Protocol (DHCP) and Point-to-Point Protocol.

11. The system of claim 8, wherein determining that a visited network does not contain any IPv6-enabled components comprises not receiving, within a specified amount of time, an IPv6 router advertisement.

12. The system of claim 8, further comprising:
    a binding update module configured to send, responsive to determining that the determined IPv4 address of the IPv6 connect agent is identical to the IPv4 address of the IPv6 connect agent that the node had previously used, a binding update to the IPv6 connect agent.

13. The system of claim 12, wherein sending a binding update to the IPv6 connect agent comprises:
    sending a previous care-of address used by the node and the obtained care-of address.

14. A system for an IPv6 connect agent to optimize handoffs when a client node has moved within an IPv4-only network, the system comprising:
    a binding update module configured to receive a binding update responsive to a detection that the client node uses the same IPv6 connect agent for a previous IPv6 communication and a current IPv6 communication over the IPv4-only network, the binding update containing a first care-of address and a second care-of address, wherein the first care-of address is associated with the previous IPv6 communication over the IPv4-only network, and the second care-of address is associated with the current IPv6 communication over the IPv4-only network; and a packet forwarding module configured to send, responsive to receiving a packet sent to the first care-of address, the packet to the second care-of address.

15. A computer readable medium containing a computer program product for a mobile dual-stack node to engage in IPv6 communication across a network containing IPv4 components, the computer program product making a computer execute the steps of:
   determining that the mobile dual-stack node has moved;
   obtaining a new IPv4 address of the mobile dual-stack node;
   determining that a visited network does not contain any IPv6-enabled components;
   determining an IPv4 address of an IPv6 connect agent including at least one of sending an IPv4 anycast message and contacting a Domain Name System server;
   obtaining a care-of address; and
   configuring the IPv6 connect agent with the care-of address.

16. The computer readable medium of claim 15, wherein determining that the node has moved comprises:
   detecting that the node has detached from one of a first network and a first subnetwork; and
   detecting that the node has attached to one of a second network and a second subnetwork.

17. The computer readable medium of claim 15, wherein obtaining a new IPv4 address comprises using one of Dynamic Host Control Protocol (DHCP) and Point-to-Point Protocol.

18. The computer readable medium of claim 15, wherein determining that a visited network does not contain any IPv6-enabled components comprises not receiving, within a specified amount of time, an IPv6 router advertisement.

19. The computer readable medium of claim 15, wherein the computer program product comprises making the computer further execute the step of:
   sending, responsive to determining that the determined IPv4 address of the IPv6 connect agent is identical to the IPv4 address of the IPv6 connect agent that the node had previously used, a binding update to the IPv6 connect agent.

20. The computer readable medium of claim 19, wherein sending a binding update to the IPv6 connect agent comprises:
   sending a previous care-of address used by the node and the obtained care-of address.

21. A computer readable medium containing a computer program product for an IPv6 connect agent to optimize handoffs when a client node has moved within an IPv4-only network, the computer program product making a computer execute the steps of:
   receiving a binding update responsive to a detection that the client node uses the same IPv6 connect agent for a previous IPv6 communication and a current IPv6 communication over the IPv4-only network, the binding update containing a first care-of address and a second care-of address, wherein the first care-of address is associated with the previous IPv6 communication over the IPv4-only network, and the second care-of address is associated with the current IPv6 communication over the IPv4-only network; and
   sending, responsive to receiving a packet sent to the first care-of address, the packet to the second care-of address.

22. A system for a mobile dual-stack node to engage in IPv6 communication across a network containing IPv4 components, the system comprising:
   means for determining that the node has moved;
   means for obtaining a new IPv4 address of the mobile dual-stack node;
   means for determining that a visited network does not contain any IPv6-enabled components;
   means for determining an IPv4 address of an IPv6 connect agent, wherein the
      means for determining the IPv4 address of an IPv6 connect agent
      comprises at least one of means for sending an IPv4 anycast message and
      means for contacting a Domain Name System server;
   means for obtaining a care-of address; and
   means for configuring the IPv6 connect agent with the care-of address.

23. The system of claim 22, wherein determining that the node has moved comprises:
   detecting that the node has detached from one of a first network and a first subnetwork; and
   detecting that the node has attached to one of a second network and a second subnetwork.

24. The system of claim 22, wherein obtaining a new IPv4 address comprises using one of Dynamic Host Control Protocol (DHCP) and Point-to-Point Protocol.

25. The system of claim 22, wherein determining that a visited network does not contain any IPv6-enabled components comprises not receiving, within a specified amount of time, an IPv6 router advertisement.

26. The system of claim 22, further comprising:
   means for sending, responsive to determining that the determined IPv4 address of the IPv6 connect agent is identical to the IPv4 address of the IPv6 connect agent that the node had previously used, a binding update to the IPv6 connect agent.

27. The system of claim 26, wherein sending a binding update to the IPv6 connect agent comprises:
   sending a previous care-of address used by the node and the obtained care-of address.

28. A system for an IPv6 connect agent to optimize handoffs when a client node has moved within an IPv4-only network, the system comprising:
   means for receiving a binding update responsive to a detection that the client node uses the same IPv6 connect agent for a previous IPv6 communication and a current IPv6 communication over the IPv4-only network, the binding update containing a first care-of address and a second care-of address, wherein the first care-of address is associated with the previous IPv6 communication over the IPv4-only network, and the second care-of address is associated with the current IPv6 communication over the IPv4-only network; and
   means for sending, responsive to receiving a packet sent to the first care-of address, the packet to the second care-of address.

* * * * *

UNITED STATES PATENT AND TRADEMARK OFFICE
CERTIFICATE OF CORRECTION

PATENT NO. : 7,746,891 B2  Page 1 of 1
APPLICATION NO. : 10/818662
DATED : June 29, 2010
INVENTOR(S) : Shu Yamamoto et al.

It is certified that error appears in the above-identified patent and that said Letters Patent is hereby corrected as shown below:

Title page
In the Abstract, line 4, replace "Bnd" with --and--.
In the Abstract, line 12, replace "updates" with --update--.
In the Abstract, line 12, replace "agents" with --agent--.
In the Abstract, line 16, replace "currents" with --current--.

Signed and Sealed this

Thirtieth Day of November, 2010

David J. Kappos
*Director of the United States Patent and Trademark Office*